(12) United States Patent
Lian et al.

(10) Patent No.: US 9,297,355 B2
(45) Date of Patent: Mar. 29, 2016

(54) METHOD FOR TRANSPORTING AN OFFSHORE WIND TURBINE IN A FLOATING MANNER

(71) Applicant: Tianjin University, Tianjin (CN)

(72) Inventors: Jijian Lian, Tianjin (CN); Hongyan Ding, Tianjin (CN); Puyang Zhang, Tianjin (CN); Aidong Li, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 14/356,605

(22) PCT Filed: Aug. 28, 2013

(86) PCT No.: PCT/CN2013/082469
§ 371 (c)(1),
(2) Date: May 7, 2014

(87) PCT Pub. No.: WO2014/075487
PCT Pub. Date: May 22, 2014

(65) Prior Publication Data
US 2015/0247485 A1 Sep. 3, 2015

(30) Foreign Application Priority Data
Nov. 19, 2012 (CN) .......................... 2012 1 0468568

(51) Int. Cl.
*F03D 1/00* (2006.01)
*F03D 11/04* (2006.01)
(Continued)

(52) U.S. Cl.
CPC ................ *F03D 1/005* (2013.01); *E02B 17/02* (2013.01); *F03D 11/04* (2013.01); *F03D 11/045* (2013.01);
(Continued)

(58) Field of Classification Search
CPC ......... F03D 1/005; F03D 11/04; F03D 1/001; F05B 2240/95; F05B 2240/93; F05B 2230/6102; F05B 2240/932; F05B 2260/02; E02B 2017/0039; E02B 2017/0047; E02B 2017/0091; E02B 17/02; E02B 17/04; E02B 17/08; E02B 2017/0043; Y02E 10/727; B63B 35/003; B63B 9/065; B63B 2035/446
See application file for complete search history.

(56) References Cited

U.S. PATENT DOCUMENTS

2004/0262926 A1* 12/2004 Hansen ................. B63B 25/002
290/44
2011/0129304 A1* 6/2011 Wu ......................... B63B 21/26
405/224

(Continued)

FOREIGN PATENT DOCUMENTS

CA          2760799 A1    11/2010
CN       101318542 A       12/2008

(Continued)

*Primary Examiner* — John Kreck
*Assistant Examiner* — Carib Oquendo
(74) *Attorney, Agent, or Firm* — George G. Wang; Bei & Ocean

(57) ABSTRACT

A method for transporting an offshore turbine, by which a frame construction is first mounted on the deck of a transportation and installation ship; a pre-made wind turbine foundation is then connected to the frame construction from beneath and temporarily fixed thereon by a steel wire tightened by a hoisting device provided on the ship; on the top of the pre-made turbine foundation a transition segment is connected; and finally, on the top of the transition segment, a wind turbine tower, a wind turbine head and blades are assembled in turn to form a finished wind turbine machine, which is now ready to be transported to an installation site.

8 Claims, 1 Drawing Sheet

(51) Int. Cl.
*E02B 17/02* (2006.01)
*E02B 17/00* (2006.01)

(52) U.S. Cl.
CPC . *E02B 2017/0047* (2013.01); *E02B 2017/0091* (2013.01); *F05B 2230/6102* (2013.01); *F05B 2240/95* (2013.01); *Y02E 10/727* (2013.01); *Y02P 70/523* (2015.11)

(56) References Cited

U.S. PATENT DOCUMENTS

| | | | |
|---|---|---|---|
| 2011/0200425 A1* | 8/2011 | Weaver | B63B 35/44 415/7 |
| 2012/0183359 A1* | 7/2012 | Nordstrom | B63B 35/003 405/205 |
| 2013/0121770 A1* | 5/2013 | Li | B63B 9/065 405/207 |

FOREIGN PATENT DOCUMENTS

| | | |
|---|---|---|
| CN | 102162429 A | 8/2011 |
| CN | 102616339 A | 8/2012 |
| CN | 102926948 A | 2/2013 |
| CN | 102926949 A | 2/2013 |
| JP | 2012-25272 A | 2/2012 |
| WO | WO2004111443 A1 | 12/2004 |
| WO | WO2006005705 A1 | 1/2006 |
| WO | WO2011097779 A1 | 8/2011 |

* cited by examiner

METHOD FOR TRANSPORTING AN OFFSHORE WIND TURBINE IN A FLOATING MANNER

CROSS-REFERENCE TO RELATED APPLICATIONS

This application claims priority from CN Application No. 201210468568.7, filed Nov. 19, 2012 and PCT Application No. PCT/CN2013/082469, filed Aug. 28, 2013, the contents of which are incorporated herein in the entirety by reference.

FIELD OF THE INVENTION

The present invention relates to an offshore transportation method and more particularly, relates to a method for transporting an offshore wind turbine in a floating manner.

BACKGROUND OF THE INVENTION

Presently, in operation of offshore wind turbine engineering, assembly of the offshore wind turbine generally includes four parts: foundation, wind turbine tower, wind turbine head and wind turbine blades. These parts are delivered to an offshore construction place, assembled together and then tested.

In engineering, the offshore turbine foundation usually adopts the following constructions: single-pile foundation, multiple-pile foundation, gravity foundation, and jacket foundation. Installation of these constructions may include partial hoisting and entire hoisting. Testing basically uses offshore testing method. These result in difficulty in transportation and mounting of the offshore wind turbine as an entirety. In addition, there is delay between transportation and mounting. It also gives rise to technical problem such as difficulty in operation in shallow water. As such, compared to land foundation, offshore wind turbine foundation will incur much investment cost, thus limiting development of offshore wind turbine.

SUMMARY OF THE INVENTION

The present invention is intended to solve the technical problem of transporting the offshore wind turbine in its entirety and thereby provide a method for transporting an offshore wind turbine in a floating manner, thus realizing delivery of whole machine, facilitating operation procedure, gaining high success rate, and greatly reducing costs.

To solve the above problem, there is provided a solution.

A method for transporting an offshore wind turbine in a floating manner includes the following steps:

(1) a frame construction is mounted on a deck of a transportation and installation ship, the frame construction is coupled with a hydraulic device capable of control extension or retraction of the frame construction; and the periphery of the frame construction is provided with locating holes;

A wind turbine foundation is prepared in advance on land; said wind turbine foundation is of a semi-closed cylinder with an opening defined in its bottom portion; its top cover has a diameter no less than the shortest side length of the frame construction; a plurality of hoisting points are evenly distributed on the top cover of the wind turbine foundation; the locations of these hoisting points correspond to locations of the locating holes provided in the frame construction; a vent hole is defined in the top cover of the foundation;

The top portion of the wind turbine foundation is fixed connected to a hollow transition segment; the largest diameter of the transition segment is smaller than the shortest side length of the frame construction such that the segment is able to pass through the frame construction;

(2) The wind turbine foundation connected with the transition segment is disposed into water by hoisting, delivered by floating manner to the transportation and installation ship, and the transition segment is extended out of the frame construction;

(3) A hoisting device is provided on the transportation and installation ship at a location corresponding to a hoisting point on the top cover of the wind turbine foundation; the steel wire of each hoisting device passes through the locating hole defined in the frame construction and is connected with a corresponding hoisting point of the wind turbine top cover;

(4) The wind turbine foundation is inflated via the vent hole defined in the top cover thereof until the top cover of the wind turbine foundation is tightly pressed against a lower portion of the frame construction;

(5) The respective steel wire is tightened by respective hoisting device such that the wind turbine foundation is temporarily secured with the frame construction;

(6) The wind turbine tower, wind turbine head and blades are hoisted in turn and then are assembled to form an entire wind turbine machine;

(7) A flexible auxiliary retention mechanism is disposed on the upper portion of said wind turbine tower, and the entire wind turbine machine is conveyed to the installation place.

In step (1), the number of the frame constructions is 1-10.

In step (1), the side length of said frame construction is 10-50 m.

In step (1), the number of said hoisting points on the wind turbine foundation and that of the locating holes defined in the frame construction both are 3-10.

In step (1), the diameter of the cylindrical construction of the wind turbine foundation is 10-50 m, and height thereof is 4-15 mm.

In step (1), the diameter of the cylindrical construction of the wind turbine foundation is 10-50 m, and height thereof is 4-15 m.

In step (1), the number of the vent holes of the wind turbine foundation is in general 1-20.

In step (1), the diameter of an upper portion of the transition segment is 4-10 m, while that of a lower portion thereof is 15-40 m; and the height of the segment is 10-60 m.

The present invention has the following advantages.

The method for transporting an offshore wind turbine in a floating manner according to the invention may achieve transporting the entire wind turbine machine in a single step, facilitate easy operation and obtain high success rate. For a huge offshore wind turbine machine, there is also no need for using large hoisting machine and convey ship to perform offshore work and accordingly, the inventive method reduces cost in a great scale compared to prior art technology. Moreover, as the wind turbine foundation, wind turbine tower, wind turbine head, as well as the wind turbine blades may maintain the same attitude throughout the manufacture, transportation and use, risk of causing damage to components of the wind turbine is reduced significantly; thereby assisting in achieving anti-damage requirement for the entire structure and further reducing construction cost.

Figure 1:
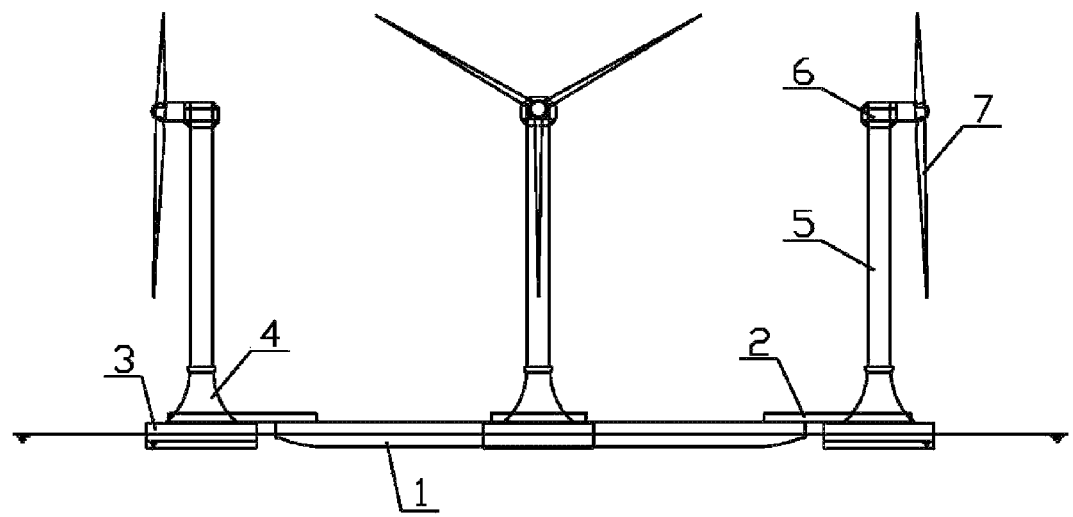
FIG. 1 shows a schematic view of transporting an entire wind turbine machine.
Figure 2:
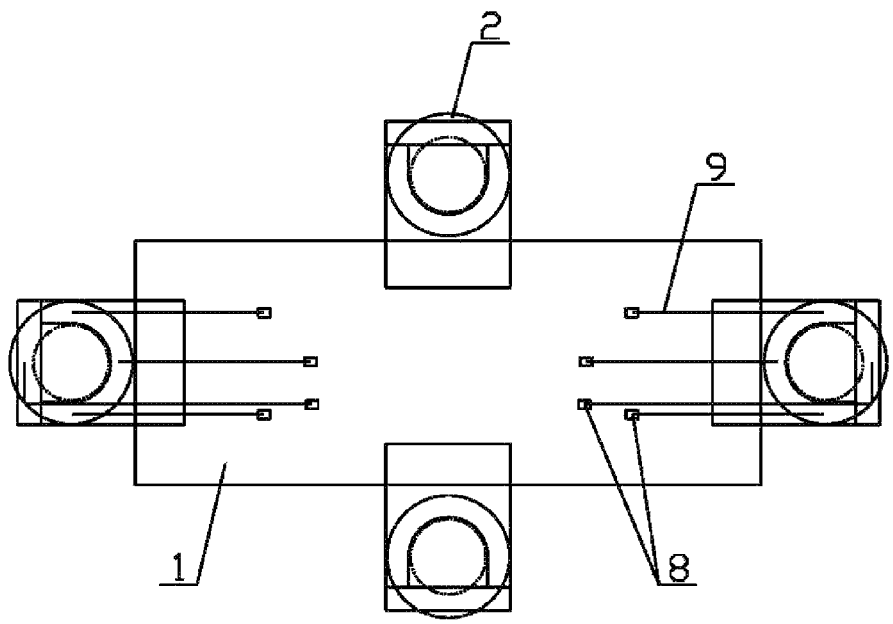
FIG. 2 shows a top plan view of FIG. 1.

In these figures, 1 represents a transportation and installation ship, 2 represents a frame construction, 3 is a wind turbine foundation, 4 is a transition segment, 5 is a wind turbine tower, 6 is a wind turbine head, 7 is a wind turbine blade, 8 is a hoisting device, and 9 is a steel wire.

DETAILED DESCRIPTION OF THE INVENTION

To further understand aspects, feature and effects of the present invention, various embodiments of the invention are illustrated below in conjunction with accompanied drawings.

An embodiment describes a method for transporting an offshore wind turbine in a floating manner which includes the following steps.

Four frame constructions 2 are mounted on a deck of a transportation and installation ship 1. Each frame construction 2 is coupled with a hydraulic device capable of control extension or retraction of the same frame construction. The number of the frame constructions is normally 1-10. The detailed number of the above construction 2 is determined by size, loading capacity of the ship, and size of the wind turbine and foundation 3. The frame construction 2 is of rectangular shape and has a side length of 25 m. The length range of its side length generally is 10-50 m. Four locating holes are defined in a periphery of the frame construction 2 for passing through a steel wire 9 of a hoisting device 8. The number of the locating holes in general is 3-10.

The wind turbine foundation 3 is prepared in advance on land; said wind turbine foundation 3 is of a semi-closed cylinder with an opening defined in its bottom portion; its top cover has a diameter no less than the shortest side length of the frame construction; the diameter of the cylindrical construction is 30 m, the height thereof is 6 m. In normal case, the diameter of the cylindrical construction is 10-50 m. The height of the cylindrical construction is 4-15 m. Four hoisting points are evenly distributed on the top cover of the wind turbine foundation 3; the locations of these hoisting points correspond to locations of the locating holes defined in the frame construction 2; accordingly, the number of the hoisting points is also 3-10. The hoisting points should be such distributed that the wind turbine foundation 3 will be raised or fall stably. Seven vent holes are defined in advance in the top cover of the above wind turbine foundation 3. The number of the vent hole is generally 1-20.

When the wind turbine foundation 3 is prepared in advance, a transition segment 4 is secured onto the top portion of the foundation 3. The transition segment 4 is hollow and its greatest diameter is smaller than the shortest side length of the frame construction so that it enables the transition segment travelling through the construction 2. The upper portion of the segment 4 is used to connect with the wind turbine tower 5. The diameter of the upper portion of the transition segment 2 is 4 m, that of the lower portion thereof is 20 m and height of the segment is 16 m. In normal situation, the diameter of an upper portion of the transition segment is 4-10 m, while that of a lower portion thereof is 15-40 m; and the height of the segment is 10-60 mm.

The wind turbine foundation 3 connected with the transition segment 4 is disposed into water by hoisting, delivered by floating manner to the transportation and installation ship 1, and the transition segment 4 is extended from bottom to top out of the frame construction 2 which is exposed outside the deck of the ship 1. At the same time, the wind turbine foundation 3 is locked into the lower portion of the construction 2.

According to the number of the hoisting points located on the top cover of the foundation 3, four hoisting devices 8 are provided correspondingly on the transportation and installation ship 1. The steel wire 9 of each hoisting device 8 passes through the locating hole of the construction 2 and is coupled with a corresponding hoisting point of the top cover of the foundation 3.

The wind turbine foundation 3 is inflated via the vent hole defined in the top cover thereof until the top cover of the wind turbine foundation 3 is tightly pressed against a lower portion of the frame construction 2.

The respective steel wire 9 is tightened by a respective hoisting device 8 and the device 8 is locked such that the wind turbine foundation 3 is temporarily secured with the frame construction 2. The securing manner may include bolt, insertion slot and snap ring.

The wind turbine tower 5, wind turbine head 6 and blades 7 are hoisted in turn and then are assembled to form an entire wind turbine machine.

A flexible auxiliary retention mechanism is disposed on the upper portion of said wind turbine tower 5, and the entire wind turbine machine is conveyed to the installation place. The flexible auxiliary retention mechanism is a system capable of providing surrounding force. During the transportation of the entire wind turbine machine, the system helps to stable the wind turbine machine. For example, steel-structure truss connected to the ship body may be disposed on the bottom end. A releasable clamping mechanism able to surround the wind turbine tower 5 may be provided on the top of the truss. Flexible material such as air cushion and rubber cushion may be sandwiched between the truss and tower 5 to restrict movement of the tower 5.

Though various embodiments of the invention have been illustrated above, a person of ordinary skill in the art will understand that, variations and improvements made upon the illustrative embodiments fall within the scope of the invention, and the scope of the invention is only limited by the accompanying claims and their equivalents.

What is claimed is:

1. A method for transporting an offshore turbine in a floating manner comprising the following steps:
   (1) mounting a frame construction on a deck of a transportation and installation ship, the frame construction being capable of extending and retracing relative to the deck;
   (2) mounting a wind turbine foundation, which is pre-made in land, has a top cover with a plurality of hoisting points and is connected with a transition segment, to the frame construction by disposing the wind turbine foundation into water via hoisting, delivering it in a floating manner to the transportation and installation ship, and extending the transition segment out of the frame construction so that the transition segment is above the frame construction while the wind turbine foundation, which is connected to said transition segment, is below the frame construction;
   (3) temporarily securing the wind turbine foundation to the frame construction by a hoisting device provided on the transportation and installation ship, from which hosting device a steel wire passes through a locating hole of the frame construction and connects to one of the hoisting point on the top cover of the wind turbine foundation;
   (4) hoisting and assembling, in turn, a wind turbine tower, a wind turbine head and blades on the transition segment to form a complete wind turbine machine; and
   (5) transporting the complete wind turbine machine carried on the transportation and installation ship to an installation site.

2. The method according to claim 1, wherein in step (3) is carried out by first inflating the wind turbine foundation until the top cover of the wind turbine foundation is tightly pressed against a lower portion of the frame construction and then tightening the steel wire by the hoisting device to temporarily secure the wind turbine foundation to the frame construction.

3. The method according to claim 1, wherein the number of the frame constructions provided on the transportation and installation ship is 1-10.

4. The method according to claim 1, wherein the frame construction has a side length between 10-50 meters.

5. The method according to claim 1, wherein the wind turbine foundation has 3-10 hoisting points and the frame construction has the same number of locating holes corresponding to the hosting points.

6. The method according to claim 1, wherein the wind turbine foundation is a cylindrical construction with a diameter between 10-50 meters and a height between 4-15 meters.

7. The method according to claim 1, wherein the wind turbine foundation has 1-20 vent holes on its top cover.

8. The method according to claim 1, wherein the transition segment has an upper end diameter between 4-10 meters, a lower end diameter between 15-40 meter, and a height between 10-60 meters.

\* \* \* \* \*